United States Patent Office 3,560,919
Patented Feb. 2, 1971

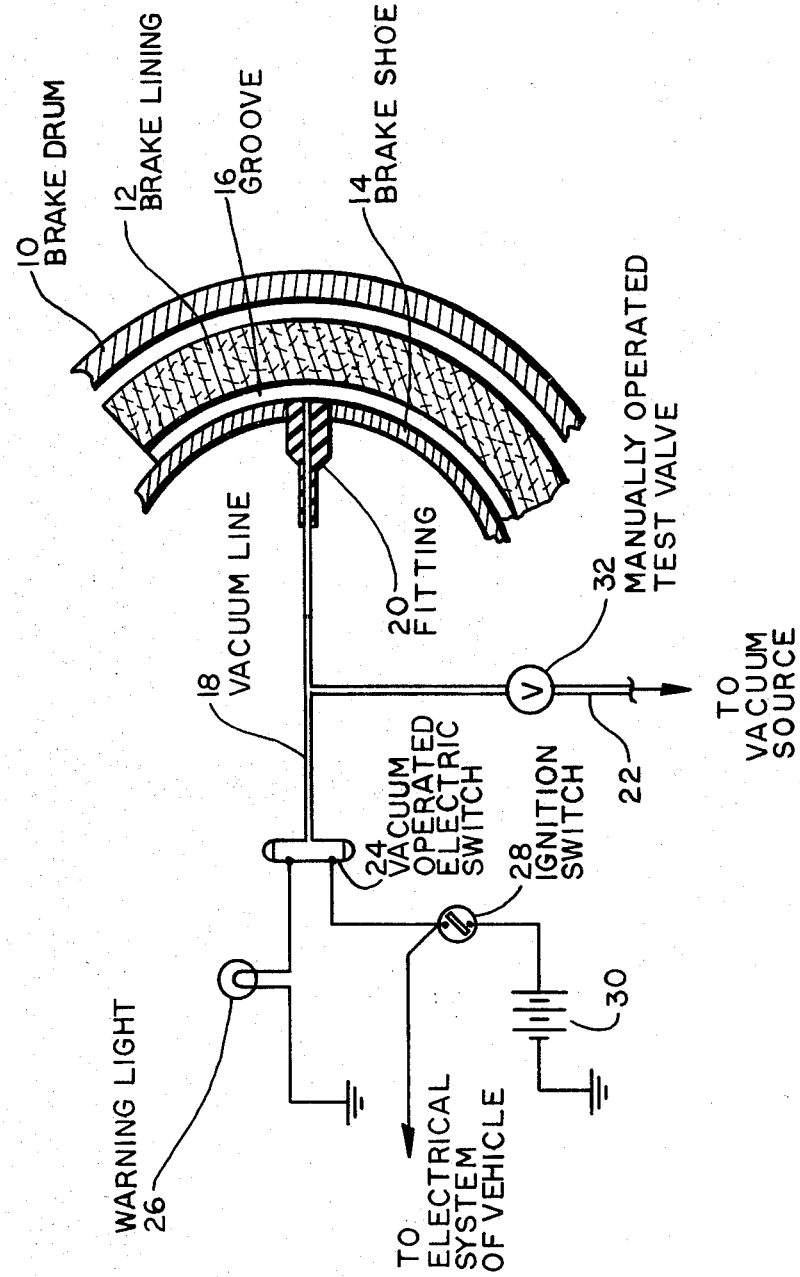

3,560,919
WEAR INDICATING SIGNALLING SYSTEM FOR A BRAKE LINING, OR THE LIKE
Armando R. Uribe, P.O. 16978, 11744 Hatteras,
North Hollywood, Calif. 91607
Filed Nov. 12, 1968, Ser. No. 775,089
Int. Cl. B60t 17/22; B60q 1/00
U.S. Cl. 340—52                        4 Claims

ABSTRACT OF THE DISCLOSURE

A pneumatic system is provided for indicating excessive wear of a normally unobservable wearing surface, such as a brake lining. The system of the invention includes air lines coupled to a pressure tight groove in the brake lining and to a vacuum pressure or positive pressure source, so as to maintain the system in a nonoperative state so long as the pressure tight integrity of the aforesaid groove is maintained. When the wear of the brake lining reaches a critical state, the groove is exposed, and the resulting pressure change in the system is utilized to activate a visual or audible alarm unit.

BACKGROUND OF THE INVENTION

Many types of wear indicating devices have been devised in the prior art which are intended to provide an indication of wear of a brake lining, or the like. However, these prior art devices and system have usually suffered from one limitation or another which have prevented their widespread commercial acceptance.

The usual prior art brake lining wear indicating device and system typically includes an electric contact member embedded in the brake lining at a predetermined depth. Then, when the electrically conductive brake drum wears the lining to a thickness corresponding to the depth of the electric contact member, an electrical circuit is completed and an associated alarm is energized.

One disadvantage of the prior art electrical type of brake lining wear signalling system, such as described in the previous paragraph, is that there is no assurance that the brake lining will wear uniformly. Thus, the brake lining may wear excessively in some areas and not in others. Consequently, excessive wear could occur without exposing the electric contact, so that no warning would be initiated, even though a critical condition exists.

Moreover, the electrical warning system of the prior art has not exhibited any degree of reliability. For example, the electrical warning system is susceptible to being short circuited by moisture, metallic dust, and the like, so as to create false warning signals.

The improved pneumatic type of warning system of the present invention is reliable in its operation, and it is not susceptible to false warning indications. Moreover, the pneumatic warning system of the invention may be made to respond to wear at any area of the brake lining beyond the critical point.

In the practice of the invention, a groove is provided in the interior of the brake lining at a position within the brake lining corresponding to the critical thickness. The groove is made pressure tight within the brake lining, and it may extend the entire length of the lining, so that excessive wear in any particular area destroys the pressure tight integrity of the groove. Whenever the groove loses its pressure tight characteristic, it creates a pressure differential in the system which serves to actuate an appropriate alarm unit, as will be described.

Although the alarm of the present invention is not susceptible to false or accidental operations, it does have a fail safe feature. That is, the pneumatic warning system of the invention, may, for example, be of the vacuum pressure type, and it requires that the vacuum pressure be maintained in the entire system in order to maintain it in an inoperative state. Whenever the vacuum pressure is lost for any reason, the alarm is initiated.

BRIEF DESCRIPTION OF THE DRAWING

The single figure is a schematic representation of a portion of a typical brake assembly, and of a pneumatic system associated therewith for indicating when the brake lining has worn to a critical thickness, the pneumatic system embodying the concepts of the present invention.

DETAILED DESCRIPTION OF THE ILLUSTRATED EMBODIMENT

The brake assembly illustrated in the drawing includes a usual brake drum 10 which is engaged by a brake lining 12, as the brake lining is moved against the drum by operation of a brake shoe 14. The brake lining frictionally engages the interior surface of the drum to perform a braking action. As is well known, the brake lining is worn by the operation of the brake and, in due course, it reaches a critical thickness at which it must be replaced.

As is also well known, brake linings in the brakes on most vehicles are relatively inaccessible and are not observable. Therefore, it is often impossible for the operator of the vehicle to be aware of the true condition of his brake linings. The system of the present invention provides a simple and reliable means for apprising the operator whenever any of his brake linings reach a critical state. The system shown may be associated with the brake lining of each wheel of the vehicle, and a common or separate indication may be provided whenever any of the brake linings reaches the aforesaid critical state.

In the practice of the invention, a groove 16 is provided within the brake lining, and in a position such that when the brake lining is bonded to the brake shoe 14, the groove 16 has pressure tight characteristics. The groove 16 retains its pressure tight characteristics until the brake lining 12 wears to a critical point, at which time the groove 16 is exposed. An air line 18 extends through a fitting 20 in the brake shoe 14 and into the groove 16. A further air line 22 couples the air line 18 to an appropriate positive pressure or vacuum pressure source, such as the carburetor or fuel pump of the vehicle.

The air line 18 is coupled to a pressure operated electric switch 24. For example, so long as a vacuum pressure is maintained in the air line 18, the switch 24 is held in an electrically open state. A warning light 26 is connected to one terminal of the switch 24. The other terminal of the switch 24 is connected through the ignition switch 28 of the vehicle to the electric power source of the vehicle, designated by the battery 30. Whenever the vacuum pressure in the line 18 rises above a critical level, for example, the pressure operated electric switch 24 closes electrically to energize the warning light 26. This occurs, for example, when the brake lining 12 wears to a level at which the groove 16 is exposed. When the engine of the vehicle is not operating, and even though there is no vacuum pressure in the system, the warning light 26 is not energized because the ignition switch 28 is off.

A manually operated valve 32 is provided which should be closed after the light 28 has been energized as a result of brake lining wear. This is so that the vacuum in the rest of the system may be maintained and so that only the light indicative of the particular worn brake lining will remain lighted in the event the other brake linings are not similarly worn.

Before closing the valve 32, it is well to test whether the lighting of the light 26 was a true warning. This may be achieved by applying the brakes and holding them applied. Then, if the warning light goes out while the brakes are so applied, it can be concluded that the warning is true.

It will be appreciated that although the system described above is illustrated and described in conjunction with a vacuum pressure source, so as to create a vacuum pressure in the air lines 18 and 22, and in the groove 16, the system could operate with positive pressure, so as to cause the pressure operated electric switch 24 to close when the pressure in the bin drops below a predetermined value due, for example, to the exposure of the groove 16.

The internal surface of the groove may be sprayed by a suitable sealant, so as to assure the retention of the vacuum pressure or positive pressure within the groove, so long as the brake line 12 is not worn to the critical level. The valve 32 may be replaced by an air filter which assures sufficient vacuum in the remainder of the system, even though the vacuum is lost in the line 18 due to the wear of the brake lining 12.

Although the pneumatic warning system of the present invention is illustrated as used in conjunction with a particular type of brake, it is evident that the system could be used in other types of brakes, such as disc brakes, and the like, and in clutches, and other instrumentalities in which wear of a normally unobservable surface occurs.

What is claimed is:

1. A brake lining monitoring system for indicating when the brake lining of a brake assembly has worn to a critical point, said brake assembly including:
    a brake shoe, a brake lining affixed to said brake shoe and having a pressure tight groove therein at a position corresponding to a thickness of the brake lining corresponding to said critical point, and a brake drum selectively engaged by said brake lining to provide a braking action which produces wear on said brake lining;
    and said monitoring system including an air line coupled to the interior of said groove; and
    means including an alarm unit coupled to said air line to be actuated when the wear of said brake lining is such to expose said groove.

2. The monitoring system defined in claim 1, and which includes a pressure actuated electric switch coupled to said air line; and an electrically energized alarm unit connected to said switch and having an electric circuit completed by said switch when the pressure in said air line changes due to the aforesaid exposure of said groove.

3. The monitoring system defined in claim 1, and which includes a further air line coupled to said first-mentioned air line and to a pressure source.

4. The monitoring system defined in claim 3, in which said pressure source creates a vacuum pressure in the aforesaid air lines and in said groove.

References Cited

UNITED STATES PATENTS

| | | | |
|---|---|---|---|
| 2,501,867 | 3/1950 | Gueisen | 340—60 |
| 3,321,045 | 5/1967 | Veilleux | 188—1A |

DONALD J. YUSKO, Primary Examiner

H. S. COHEN, Assistant Examiner

U.S. Cl. X.R.

188—1